United States Patent

[11] 3,624,292

[72] Inventor John Guzak, Jr.
Waukegan, Ill.
[21] Appl. No. 688,523
[22] Filed Dec. 6, 1967
[45] Patented Nov. 30, 1971
[73] Assignee SCM Corporation
New York, N.Y.

[54] COMMUNICATION SYSTEM INCLUDING AN ANSWER-BACK MESSAGE GENERATOR AND KEYBOARD

8 Claims, 8 Drawing Figs.

[52] U.S. Cl. 178/17.5, 179/2 DP
[51] Int. Cl. H04l 13/16
[50] Field of Search 178/17.5, 3, 17, 17 C; 340/147, 348; 179/2 DP, 90 BD, 90 BB, 90 K, 3, 4

[56] References Cited

UNITED STATES PATENTS

| | | | |
|---|---|---|---|
| 3,515,806 | 6/1970 | Spraker | 179/2 DP |
| 3,515,814 | 6/1970 | Morgan | 179/2 DP |
| 3,459,890 | 8/1969 | Augustin et al. | 178/17 |
| 3,394,368 | 7/1968 | Carr et al. | 178/17 |
| 3,308,918 | 3/1967 | James | 178/17 |
| 2,869,703 | 1/1959 | Hebel | 178/17 |
| 1,994,949 | 3/1935 | Huebner et al. | 178/17 |
| 1,804,496 | 5/1931 | Creed et al. | 178/17 |
| 3,504,132 | 3/1970 | Wallace | 179/90 |
| 3,436,477 | 4/1969 | Ghiringhelli | 178/26 |
| 3,430,004 | 2/1969 | Shenk | 179/90 |
| 3,388,375 | 6/1968 | Sloughter | 340/18 |
| 3,371,163 | 2/1968 | Moseley | 179/90 |
| 3,364,314 | 1/1968 | Huizinga | 179/90 |
| 3,341,666 | 9/1967 | Wallace | 179/90 |
| 3,321,584 | 5/1967 | Lockwood | 179/90 |
| 3,301,967 | 1/1967 | Plyer | 179/90 |
| 3,291,919 | 12/1966 | Robitaille | 340/147 |
| 3,235,661 | 2/1966 | Oxley | 178/26 |
| 3,059,048 | 10/1962 | Lamin | 178/3 |
| 3,016,423 | 1/1962 | Ambrosio | 178/79 |
| 3,001,016 | 9/1961 | Rudolph | 178/17.5 |
| 2,903,513 | 9/1959 | Phelps | 178/17.5 |
| 2,564,410 | 8/1951 | Schmidt | 177/353 |

*Primary Examiner*—Kathleen H. Claffy
*Assistant Examiner*—Tom D'Amico
*Attorney*—Mason, Kolehmainen, Rathburn and Wyss

ABSTRACT: A communication system with a calling station and a called station interconnected by a communications channel, with an answer back message generator and a keyboard at the called station. The operation of the answer back message generator can be initiated by an inquiry signal from the calling station. The message generator includes an electronic distributor and individual successive coded units which provide network circuit links for network circuits formed in part by the electronic distributor and by gating circuits for memory devices. The memory devices and various other components of the system are common to the message generator and to the keyboard machine. As the coded units are modular in construction, the message generator can be set up initially to generate a message made up of any desired signals, and yet, one or more of the coded units can be individually removed and replaced by other and different coded units so that a different message can be generated.

INVENTOR.
JOHN GUZAK, JR.
BY [signature]
ATTORNEY

INVENTOR.
JOHN GUZAK, JR.
BY Joseph J. Grass
ATTORNEY

INVENTOR.
JOHN GUZAK, JR.

BY Joseph J. Gross
ATTORNEY

COMMUNICATION SYSTEM INCLUDING AN ANSWER-BACK MESSAGE GENERATOR AND KEYBOARD

This invention relates in general to a communication system and in particular to a system for generating signals selectively from a message generator and from a keyboard.

It is an object of the invention to provide improved electronic circuitry for generating signals either from a coded message generator or from a keyboard, wherein various electronic components of the coded message generator and the keyboard are common.

It is another object of the invention to provide a message generator having an electronic distributor for energizing successive coded network circuits, together with a group of memory devices, each network circuit being connected to one or more of the memory devices through coded units corresponding to the signal to be generated, each network circuit providing one or more chargeable circuits, each signal being substantially generated, transferred to the memory devices, stored in the memory devices, and transferred out of the memory devices.

It is another object of the invention to provide a communication system including an answer-back message generator having improved circuitry formed in part by a series of groups of network circuit links, each group of links providing a code pattern for producing a selected signal, each group of network links being individually readily removable from the circuitry and replaceable by another and different network link group so that any selected answer-back message can be generated.

Other objects and features of the invention will be more readily apparent from the following description and the accompanying drawings, in which.

Figure 1:
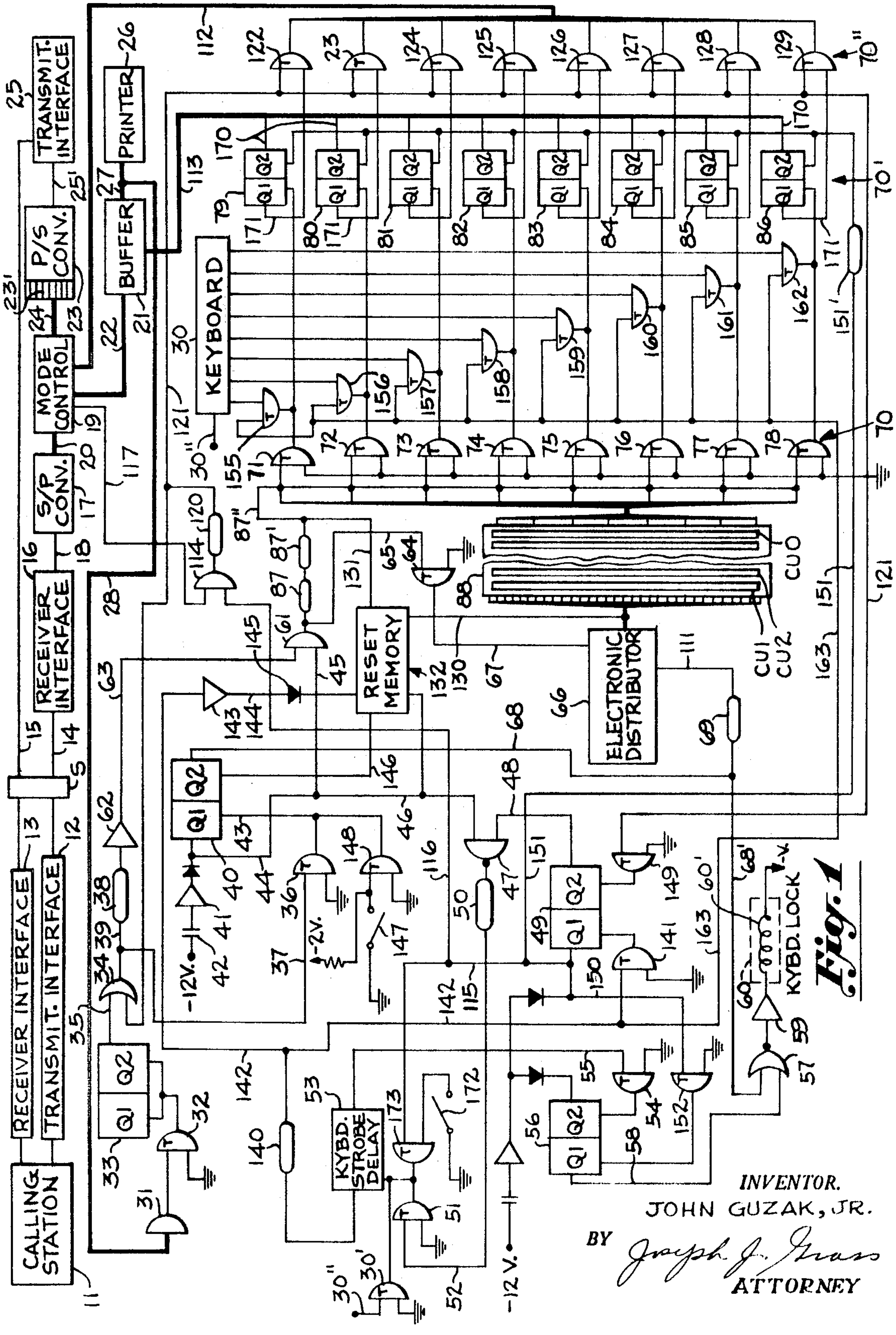
FIG. 1 is a schematic view of a communication system embodying the invention the various components being represented by logic symbols.

Referring to FIG. 1 of the drawing, there is illustrated a communication system which includes a calling station 11 having a transmitter interface 12 and a receiver interface 13. The called station, represented by the remainder of FIG. 1, is interconnected to the calling station 11 by a communication channel shown to be two conductors 14 and 15, but they can be interconnected by radio if desired. Although only one called station is illustrated, it is understood that a multiplicity of called stations are usually interconnected with the calling station 11 through a switching arrangement S, as is known in the art.

The called station shown in FIG. 1 includes a receiver interface 16 to which the conductor 14 is connected, a serial-to-parallel converter 17 connected to the output of the receiver interface 16 by a conductor 18, and a mode control 19 connected to the output of the serial-to-parallel converter 17 by a group of conductors 20. The mode control 19 is connected to a buffer 21 by a group of conductors 22 and is also connected to a parallel-to-serial converter 23 by a group of conductors 24. A transmitter interface 25 is connected to the output of the parallel-to-serial converter 23 by a conductor 25'. The conductor 15 inter-connects the output of the transmitter interface 25 to the input of the receiver interface 13. A group of conductors 27 connect the buffer 21 and a printer 26, and a group of conductors 28 branch off from the conductor group 27 and are connected to the input of an AND-gate 31.

The system provides for generation of one or more signals constituting an answer-back message at the called station in response to an inquiry signal from the calling station 11. Also, signals can be generated by means of a keyboard 30 at the called station. The terms "calling station" and "called station" are not intended to limit the invention, as both such stations are capable of transmitting and receiving signals. When the calling station 11 desires to communicate with a selected one of the called stations, it transmits an inquiry signal through the switching arrangement S to the selected called station to enable its AND-gate 31. Thereupon, the selected called station generates and transmits an answer-back message to the calling station 11.

Figures 2, 3, 4, 5, 8:
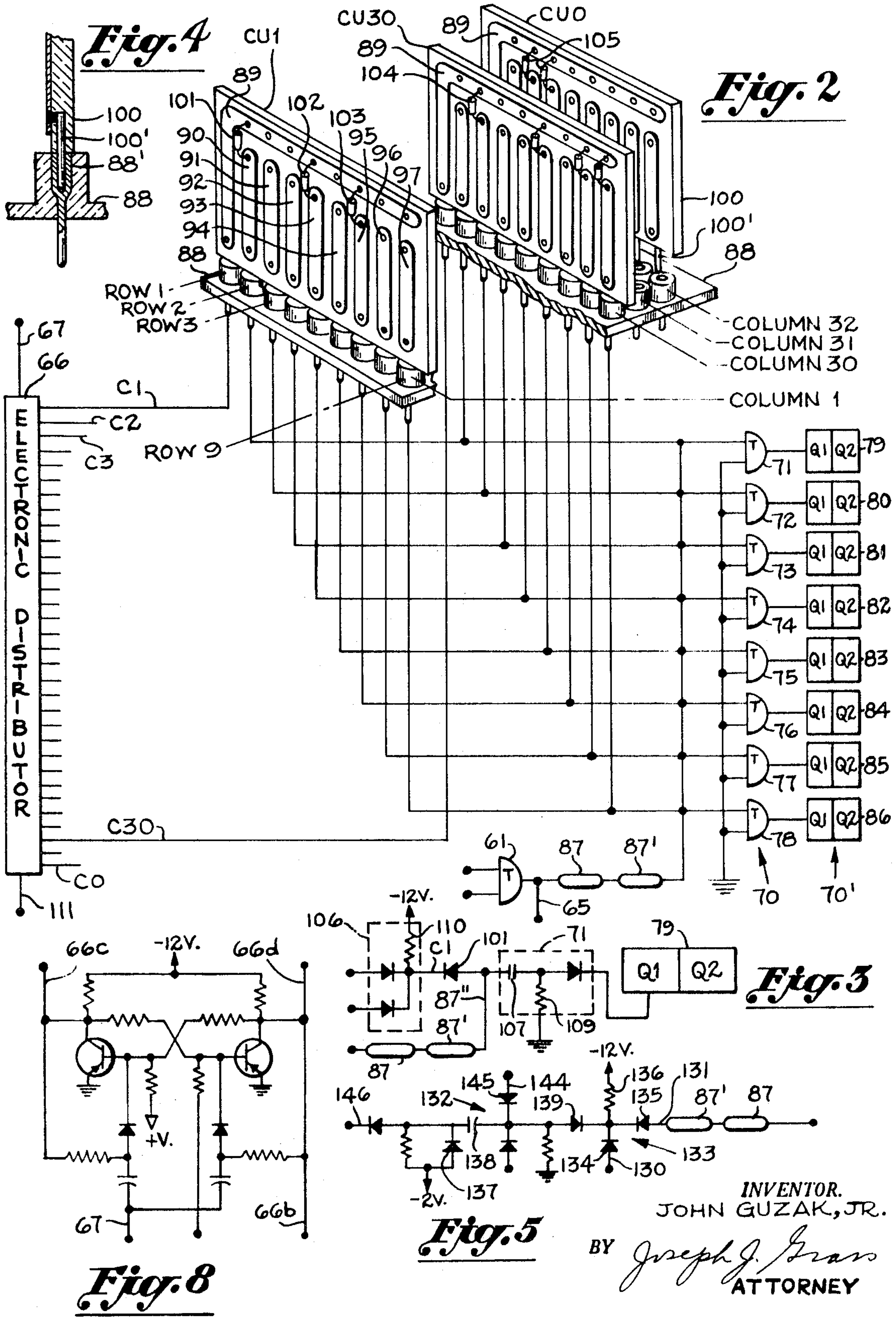
FIG. 2 is a partly schematic view showing an electronic distributor and a group of memory devices with network circuits including network circuit links provided by printed circuit boards.
FIG. 3 is partly schematic circuit diagram for one circuit of a network circuit shown in FIG. 2.
FIG. 4 is a fragmentary sectional view showing one plug connector of the printed circuit board received in a socket of a terminal board.
FIG. 5 is a circuit diagram of the reset memory shown in FIG. 1.
FIG. 8 is a circuit diagram of REG. A shown in logic symbol form in FIG. 6.

When the AND-gate 31 of the selected called station is enabled, it triggers the pedestal gate 32 which sets an inquiry signal memory 33. The memory 33 is a bistable two-state device, of the type shown in FIG. 8. When the memory 33 changes state it enables an OR-gate 34 via conductor 35. Enablement of the OR-gate 34 triggers a pedestal gate 36 via conductor 37 and also initiates the operation of an electronic time delay 38 via a conductor 39. A control memory 40, also in the form of a bistable device of the type shown in FIG. 8, is conditioned to an initial condition by a set amplifier 41 connected to a capacitor 42 which is connected to a source of negative DC voltage. The set amplifier 41 initially turns "on" the transistor Q1 of the control memory 40. When the pedestal gate 36 is triggered, a pulse via conductor 43 turns "off" the transistor Q1 of the control memory 40, thereby placing a negative voltage condition on a conductor 44 and branch conductors 45 and 46. A NAND-gate 47 is enabled when the conductor 46 and a conductor 48 connected to a system-has-character-to-process memory 49 are both at negative potential. The memory 49 is also a bistable device of the type shown in FIG. 8. When the NAND-gate 47 is enabled, the operation of an electronic time delay 50 is limited. The time delay 50 prevents false triggering of a pedestal gate 51. At the end of the operation of the time delay 50, the pedestal gate 51 is triggered by a pulse on a conductor 52. The pedestal gate 51 initiates the operation of a delay 53. The delay 53 produces a timed pulse slightly longer in duration than the time required to operate memory devices of the group 70' of memory devices from either the keyboard 30 or the message generator. The delay 53 is a one-shot in the illustrated embodiment. Initiation of operation of the time delay 53 will trigger a pedestal gate 54 via conductor 55 to trigger a keyboard lock memory or control device 56. The keyboard lock memory 56 includes a bistable device of the type shown in FIG. 8, which, when triggered by the pedestal gate 54, enables a NOR-gate 57 as a result of a ground voltage condition being placed on conductor 58. An amplifier 59 connected to the output of the NOR-gate 57 is connected to a solenoid 60' of a keyboard lock 60 to lock the keyboard 30 against operation. The keyboard 30 remains locked until the NOR-gate 57 is no longer enabled.

One input of an AND-gate 61 is connected with the control memory 40 via conductors 44 and 45. The output of the time delay 38 is connected to an amplifier 62 which is connected to the other input of the AND-gate 61 via a conductor 63. When a negative voltage condition is applied to both conductors 45 and 63, the AND-gate 61 is enabled. A pedestal gate 64, connected to the output of the AND-gate 61 by a conductor 65, is triggered when the AND-gate 61 is enabled. Triggering of the pedestal gate 64 advances an electronic distributor 66 via conductor 67. The electronic distributor 66, best shown in FIG. 6, includes a set of registers **66*a* connected and arranged to provide a counter. The register 66*a* to which the conductor 67 is connected is shown in its entirety in detail in FIG. 8. The registers 66*a* are connected to each other by conductors 66*b*. Each register 66*a* has a pair of output conductors 66*c* and 66*d*, connected through diodes 66e to selected conductors 66f. The diodes 66e and AND-gates 106** are connected and arranged to provide a diode matrix.

When the control memory 40 is triggered by the pedestal gate 36, a ground voltage condition applied to a conductor 68 initiates operation of an electronic reset time delay 69. The delay time of the delay 69 is very short, in fact shorter than the delay time of the delay 38, so that the electronic distributor 66 is first reset to initial or count 0 condition.

Thereafter, the electronic distributor 66 is advanced each time the pedestal gate 64 is triggered. The ground voltage condition on a conductor 68', connected to the conductor 68 and to the NOR-gate 57, will enable the NOR-gate 57 to lock the keyboard 30 until the control memory 40 is reset to its initial condition.

When the electronic distributor 66 is advanced to the Count 1 condition, its output conductor C1, as best shown in FIG. 2, completes a network circuit through the first coded unit CU1 and through predetermined pedestal gates, of the group 70 of pedestal gates, to ground. The group 70 is shown to have eight pedestal gates 71 through 78 which are connected to group 70' of respective memory devices 79 through 86. Each of the memory devices 79 through 86 is a bistable device of the type shown in FIG. 8.

An electronic delay 87 is connected to the output of the AND-gate 61 and an electronic time delay 87' is connected to the output of the delay 87. The delay 87' is operative, at the end of the total delay times of the delays 87 and 87', to apply ground voltage conditions via conductor 87'' to each of the pedestal gates of the group 70 through which a circuit was completed when the electronic distributor 66 was advanced, thereby operating respective ones of the memory devices 79 through 86.

In FIG. 2, fragmentary portions of a terminal board 88 are shown. The terminal board 88 has nine rows and 32 columns of socket connectors 88', one of which is shown in detail in FIG. 4. Each column can accept a coded unit. Additional columns can be provided to accepted additional coded units in the event the capacity of the distributor 66 is expanded. The coded units preferably all have the same construction, namely, printed circuit boards, each having an L-shaped common conductor 89 and a plurality of separate, parallel, spaced-apart conductors 90 through 97, each conductor 89 through 97 being printed on an electrically insulating backing or mounting structure 100, connected to a separate plug connector 100'. The plug connectors 100' of any coded unit are axially aligned with the socket connectors 88' of any column. Successive connectors 88' of Row 1 are connected to successive conductors C1 through C0 of the electronic distributor 66. For example, example, the conductor C1 is connected to the connector 88' in Row 1, Column 1; the conductor C2 is connected to the connector 88' in Row 1, Column 2; and so on. All the conductors 88' in any one row are connected to one respective pedestal gate of the group 70. Thus, all the connectors of Row 2 are connected to the pedestal gate 71, all the connectors of Row 3 are connected to the pedestal gates 72, and so on.

The coded units shown in FIG. 2 differ in that different conductors 90 through 97 are connected to the common conductor 89. For the coded unit CU1, conductors 90, 93 and 95 are connected to the common conductor 89 by respective diodes 101, 102 and 103 which constitute a diode matrix. The coded unit CU1, thus, provides a network circuit link connecting the conductor C1 and the pedestal 71, 74 and 76. The coded unit CU30 provides a network circuit link connecting the conductor C30 and the pedestal gates 72, 75, 77 and 78. The coded unit CUO provides a network circuit link between the conductor C0 and the pedestal gates 72 and 73.

Figure 6:
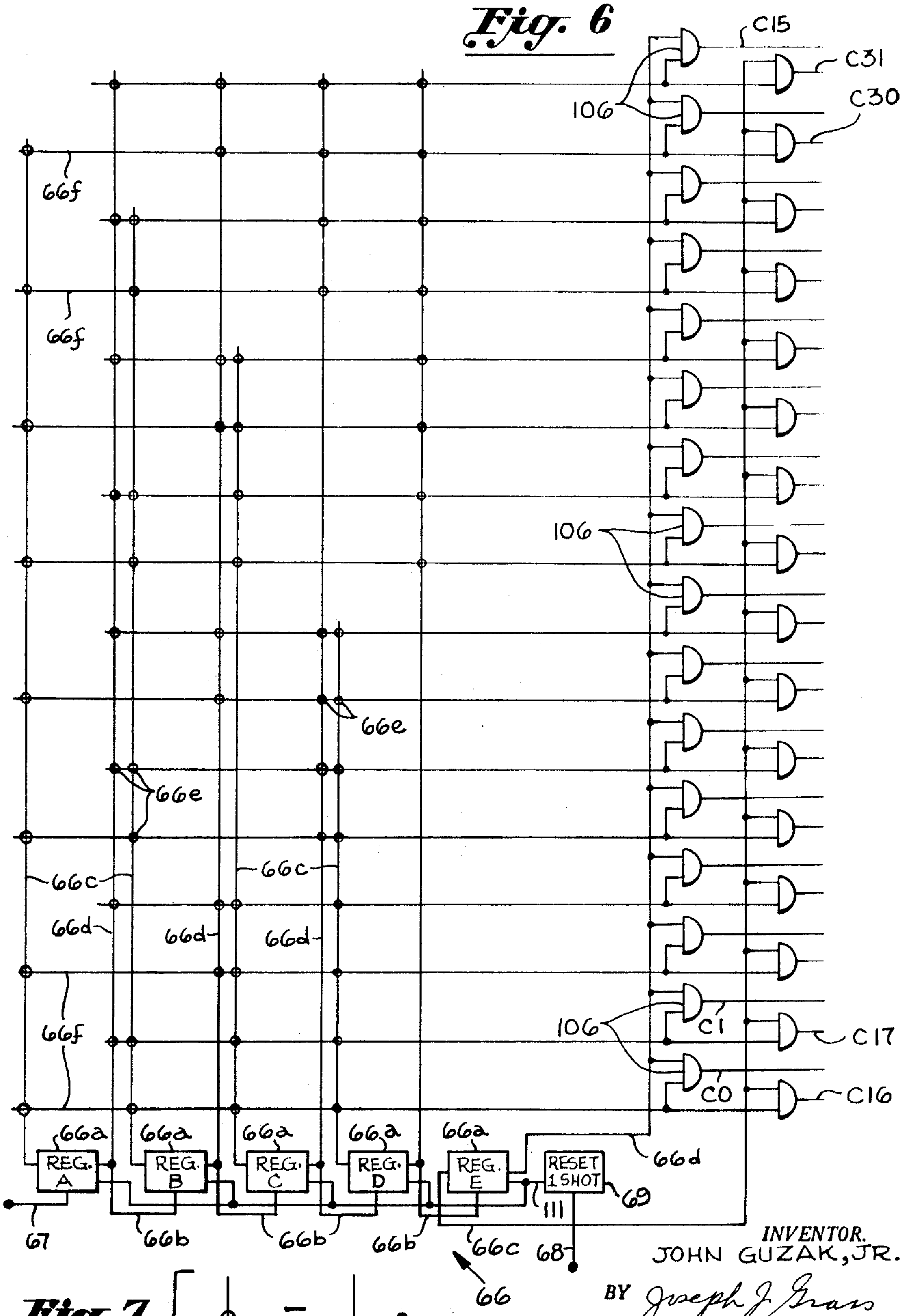
FIG. 6 is a view showing the electronic distributor in greater detail.
Figure 7:
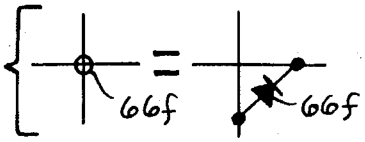
FIG. 7 is a view showing a logic symbol and the equivalent circuit connection in which a pair of conductors are connected by a diode, such logic symbols being used in FIG. 6.

As shown in FIG. 6, the electronic distributor 66 has 32 gates 106 having output conductors C1 through C0. FIG. 3 shows one AND-gate 106 and its output conductor C1 connected to the cathode of one diode 101 of the three diodes of the coded unit CU1. The pedestal gate 71 has a capacitor 107, the one side of which is connected to the anode of the diode 101 and to the output of the delay 87', the other side of the capacitor 107 being directly connected to the anode of a diode 108 and to a resistor 109. The cathode of the diode 108 is connected to the base of the transistor Q1 of the memory device 79. With continued reference to FIG. 3, when the AND-gate 106 is enabled, a charging circuit is established from ground, through the resistor 109, the capacitor 107, the diode 101, a resistor 110 of the AND-gate 106 to the negative DC voltage source. At the end of the total delay times of the delays 87 and 87' the delay 87' applies a ground voltage condition to a conductor 87'', thereby rereferencing the capacitor 107 to turn "off" the transistor Q1 of the memory device 79 and simultaneously turn "on" its transistor Q2. Each network circuit provides one or more circuits like the one depicted in FIG. 3. For example, the coded unit CU1 includes three such circuits which are completed whenever the conductor C1 is energized, namely, one such circuit is provided between ground, the pedestal gate 71, the conductor 90, the diode 101, the conductor 89 and the conductor C1 and the associated AND-gate 106 of the electronic distributor 66, another circuit is provided between ground, the pedestal gate 74, the conductor 93, the diode 102, the conductor 89, and the conductor C1 to the associated AND-gate 106, and yet another circuit is provided between ground, the pedestal gate 74, the conductor 95, the diode 103, the conductor 89 and the conductor C1 to the associated AND-gate 106. Similarly, the coded unit CU30 shown in FIG. 2 provides a network circuit link for four circuits, and the coded unit CU0 provides a network circuit link for two circuits.

As the electronic distributor 66 is advanced, the next successive network circuit through the next successive coded unit is completed. Thereafter, then the delay 87' places a ground voltage condition on the conductor 87'', the capacitors of the pedestals gates 71 through 78 which have been charged will be rereferenced and the corresponding memory devices of the group 70' of memory devices 79 through 86 will change state. Thus, the coding of any particular coded unit, that is, the one or ones of the conductors 90 through 97 which are connected to the conductor 89 through diodes, will determine which one or ones of the memory devices 79 through 86 will change state. Thus, each time the circuit network through a coded unit is completed, the predetermined network circuit, which can effect change of state of corresponding memory devices of the set of memory devices 79 through 86, is completed. Therefore, the signal which is generated depends upon the coding of the coded unit. Each of the illustrated coded units CU1, CU30 and CU0 is coded differently in that each has a different diode matrix and consequently each will provide a different predetermined signal. The sequence of signals generated as the electronic distributor 66 is successively advanced is dependent upon the coding of the succession of coded units. When it is desired to generate a particular signal or a particular sequence of signals as for an answer-back message, coded units providing network circuit links which will generate the desired signal or signals are selected and plugged into the terminal board 88. When it is desired to generate a different signal, that coded unit is unplugged and another and different coded unit which is coded to effect generation of the desired signal is plugged into the terminal board 88 in its place. In this manner one signal or an entire set of signals can be readily changed.

When one signal has been stored in the memory devices 79 through 86, that signal will be transferred to the mode control 19 via a group of conductors 112, provided the mode control 19 indicates it is ready to accept the signal and provided there is a signal stored in any of the memory devices 79 through 86. An AND-gate 114 has one input connected to the left-hand collector of the transistor Q1 of the memory device 49 via conductors 115 and 116, and has its other input connected to the mode control 19 via conductor 117. The AND-gate 114 is connected to an electronic time delay 120, which in turn is connected to a conductor 121. The conductor 121 is connected to one input of the OR-gate 34 and to the triggers of pedestal gates 122 through 129. Thus, as soon as negative potential is simultaneously applied to both inputs to the AND-gate 114 as a result of the memory device 49 having operated initially and as a result of the parallel-to-serial converter 23 indicating its readiness to accept data, as would be indicated by a negative voltage condition on one of the conductors 24 which is connected to the conductor 117 through the mode control 19. Thus, at the end of the delay time of the delay 120, the positive-going voltage condition on the conductor 121 will trigger all the pedestal gates of the group of pedestal gates 122 through 129 which are connected to memory devices of the group of memory devices 79 through 86 which have been previously set, thereby transferring the signal to the mode control 19, and through the parallel-to-serial converter 23 and the transmitter via the conductor 15 to the receiver interface 13 of the calling station 11.

When the conductor 121 enabled the OR-gate 34, the AND-gate 61 was enabled again because the negative voltage condition is still on the conductor 45 and because a negative voltage condition was again applied to the conductor 63. When the AND-gate 61 is enabled, the pedestal gate 64 is triggered, thereby advancing the electronic distributor 66, and enabling the AND-gate 106 to which the conductor C2 is connected. When the conductor C2 is energized, the network circuit through its associated coded unit is completed. This results in charging the capacitor in each one of the group of pedestal gates 71 through 78 which is in that network circuit. At the end of the delay times of delays 87 and 87′ those pedestal gates whose capacitors have been charged are triggered, thereby setting corresponding memory devices 79 through 86. The signal now stored in the memory devices 79 through 86 is transferred to the calling action 11 as described above. So long as the control memory 40 remains set, each time the OR-gate 34 is enabled by a negative condition on the conductor 121, the previously described operation is initiated, namely: the electronic distributor 66 is advanced, completing the next successive network circuit to charge capacitors in predetermined ones of the pedestal gates 71 through 78; thereafter, these predetermined pedestal gates are triggered by the time delay 87′ and corresponding memory devices of the memory devices 79 through 86 are set, and the signal is transferred out of the memory devices 79 through 86 when the AND-gate 114 is enabled, and a positive-going voltage transition is applied to the conductor 112 at the end of the delay time of the delay 120, and the signal is transferred to the calling station 11 as previously described. This succession of operations is repeated until the entire message has been generated.

A conductor 130 is connected to the conductor of the set of conductors C1 through C0 to which the last coded unit is connected. The last coded unit corresponds to the last signal of the message; when the network circuit having the last coded unit is energized, the conductor 130 has a negative voltage condition applied to it. When the AND-gate 61 is enabled during the cycle of generation of the last signal in the message, a conductor 131 also has a negative voltage condition applied to it. Conductors 130 and 131 are connected to a memory generally indicated at 132 in FIG. 1. The memory 132, as shown in detail in FIG. 5, includes an AND-gate 133. The AND-gate 133 has a diode 134 connected to the conductor 130, a diode 135 connected to the conductor 131, and a resistor 136 connected to a source of negative DC voltage. When a negative voltage condition is applied to the conductors 130 and 131 and respective diodes 134 and 135, AND-gate 133 is enabled and a charging circuit is completed from the negative 2-volt DC voltage source, through a diode 137, the capacitor 138, the diode 139, and the resistor 136 to the negative 12-volt DC voltage source. At the end of the delay period of the time delay 53, the operation of an electronic delay 140 is initiated, thereby triggering a pedestal gate 141 via a conductor 142 to reset the memory 49 and operating an amplifier 143 to place positive-going voltage condition on a conductor 144 and a diode 145. This enables the capacitor 138 to be rereferenced, thereby providing an output to a conductor 146. The conductor 146 is connected to the base of the transistor Q2 of the memory device 40. The output from the reset memory 132 via conductor 146 serves to reset the control memory 40.

The control memory 40 can be set either by an inquiry signal from the calling station 11 or by closing a manual switch 147 conveniently located at the called station. Closure of the switch 147 triggers a pedestal gate 148 which sets the control 40 via the conductor 43. Once the control memory 40 is set, the sequence of signals constituting the answer-back message is generated and the signals are transmitted to the calling station 11 and/or printed out by the printer 26 depending on the mode of operation for which the mode control 19 is set.

Each time the conductor 121 has a positive-going voltage condition applied to it by the delay 120, a pedestal gate 149 is triggered to reset the memory 49 by turning its transistor Q2 off. This effects application of a ground condition to the conductors 115 and 116 and to conductors 150 and 151. Application of the ground condition to the conductor 150 triggers a pedestal gate 152 which resets the keyboard lock memory 56. Resetting of the keyboard lock memory 56 places a negative voltage condition on the one input of the NOR-gate 57 via the conductor 58. The solenoid 60′ is, however, not unlocked until the control memory 40 is reset because, while the control memory 40 is in the set state, its transistor Q2 being off, the input to the NOR-gate 57 via conductor 68′ will still be at ground voltage condition. Thus, the keyboard 30 will not be unlocked until the entire message has been generated and transferred out of the memory devices 79 through 86.

Signals can also be generated from the keyboard 30. A plurality of keys (not shown) of the keyboard 30 operate selective pedestal gates 155 through 162, depending upon which key is depressed. When a signal is to be generated from the keyboard 30, a selected signal key is depressed, and predetermined ones of the pedestal gates of the set of pedestal gates 155 through 162 are operated. Each time any signal key is depressed, a pedestal gate 30′ will be triggered by a ground voltage condition on a conductor 30″, thereby initiating the operation of the time delay 53. At the end of the delay time of the delay 53, a positive-going voltage condition is applied to the conductor 142 and a conductor 163 triggers those predetermined pedestal gates which have been set, thereby setting corresponding memory devices of the group 70′ of memory devices 79 through 86. For example if a signal key of the keyboard has been depressed which effected setting pedestal gates 155, 156, and 162, a subsequent ground voltage condition applied to the conductors 142 and 163 by the time delay 140 will trigger only those pedestal gates 155, 156 and 162 which have been set. Consequently, only corresponding memory devices 79, 80 and 86 will be set, which, in turn, automatically set pedestal gates 122, 123 and 129. Thereafter, a negative voltage condition applied to the conductor 121 will trigger the pedestal gates 122, 123 and 129.

Operation of any signal key of the keyboard 30 will set predetermined ones of said memory devices 79 through 86. Each memory device 79 through 86 has output conductors 170 and 171. The group 113 of conductors 170 provides a parallel data bit inputs to the buffer 21, each conductor 170 being connected to the collector of the transistor Q2 of its associated memory device. Conductors 171 connect the collectors of the transistors Q1 of the memory devices 79 through 86 with respective pedestal gates 122 through 129. The group 112 of eight conductors provide a parallel data bit input to the mode control 19. The eight parallel data bits are transferred directly to the eight memory device 23′ constituting part of the parallel-to-serial converter 23. It is not necessary that the memory devices 23′ constitute part of the parallel-to-serial converter 23. The serial data bit output of the parallel-to-serial converter 23 is transferred via the conductor 25′ to the transmitter interface 25 and to the receiver interface 13 via the conductor 15.

A repeat switch 172, which may be located on the keyboard 30, can be manually closed to trigger the pedestal gate 173 to initiate the operation of the time delay 53. Depression of the switch 172 while the selected signal key is held depressed will enable the selected signal to be repeated, due to the triggering of pedestal gate 173. There is a mechanical connection (not shown) between the keyboard lock 60 and the switch 172, so that while the lock solenoid 60' is energized to lock the keyboard 30, closure of the switch 172 is prevented.

The operation of the system will now briefly be described, firstly for the answer-back mode of operation and secondly for the keyboard mode of operation. It is customary for the calling station to request that the called station identify itself before data signals are transmitted between the calling station and the called station. In the illustrated embodiment, the calling station 11 would transmit a special or inquiry signal, through its transmitter interface 12, via conductor 14 and the switching arrangement S to the called station. The inquiry signal received by the receiver interface 16 in serial form is converted to a parallel signal in the converter 17 and is transferred through the mode control 19 to the AND-gate 31. The AND-gate 31 will be enabled only by the inquiry signal. When the AND-gate 31 is enabled, the pedestal gate 32 is triggered and the inquiry signal memory 33 is set. Setting of the memory 33 enables the OR-gate 34. When the OR-gate 34 is enabled, it causes the pedestal gate 36 to set the control memory 40 and causes AND-gate 61 to be enabled following the delay time of the time delay 38. As soon as the memory 40 is set, a negative voltage condition is applied to the NAND-gate 47 via conductors 44 and 46. As the conductor 62 already is at a negative voltage condition, the NAND-gate 47 is immediately enabled and, at the end of the delay time of the time delay 50, the pedestal gate 51 is triggered to initiate the operation of the one-shot time delay 53. When a negative voltage condition was applied to the conductor 44, that condition was also applied to the conductor 45. Consequently, the AND-gate 61 will be enabled when both conductors 45 and 63 are simultaneously at a negative voltage condition. When the control memory 40 was set, a ground voltage condition was applied to the conductor 68' which immediately enabled the NOR-gate 57 to lock the keyboard 30. After a brief delay afforded by the time delay 69 the electronic distributor 66 is reset via the conductor 111.

The delay time of the delay 69 is shorter than the delay time of the delay 38 to assure resetting of the distributor 66 before the AND-gate 61 is enabled. When the AND-gate 61 is enabled, the pedestal gate 64 is triggered to advance the electronic distributor 66 from count 0 to 1 complete a circuit network through the first coded unit CU1. This network circuit is completed through predetermined pedestal gates of the group 70 of pedestal gates. The coding of the coded unit CU1 determines which pedestal gates of the group 70 are in the network circuit. At the end of the delay times of time delays 87 and 87', the capacitors of these predetermined pedestal gates are rereferenced and corresponding memory devices of the group 70' are set. The voltage conditions on output conductors 170 of the group 70' represent parallel data bits of the predetermined signal. The parallel signal is transferred to the buffer 21 from which it can be printed out by the printer 26. When the predetermined memory devices of the group 70' were set, corresponding pedestal gates of the group 70'' were also set. Thereafter, when the AND-gate 114 is enabled as a result of the memory 49 applying a negative voltage condition to the conductors 115 and 116 and as a result of the parallel-to-serial converter 23 applying a negative voltage condition (a "ready" signal) through the mode control 19 to the conductor 117 a ground voltage condition is applied to the conductor 121 at the end of the delay time of the time delay 120, thereby triggering the set pedestal gates of the group 70''. Thus, one parallel data signal is transferred by conductor group 112 to the mode control 19, into the parallel data memory devices 23' of the parallel-to-serial converter 23, to the transmitter interface 25, and to the calling station 11 via the conductor 15.

The positive-going voltage condition which was applied to the conductor 121 also triggered the pedestal gate 149 to reset the system-has-character-to-process memory 49, thereby placing a ground voltage condition on conductors 115 and 151 to effect resetting of the memory devices 79 through 86 at the end of the delay time of the electronic time delay 151'. When positive-going voltage condition was applied to the conductor 121, the OR-gate 34 was enabled, thereby causing a negative voltage condition to be applied to the conductor 63 at the end of the delay time of the time delay 38. As the control memory 40 is still set, a negative voltage condition is still being applied to the conductors 44 and 45. Thus, the AND-gate 61 is enabled again and the foregoing sequence of operations is repeated to generate the next successive signal. This next successive signal is determined by the coding of the next successive coded unit. When the last signal of the message is generated, that is, when the last count is reached by the distributor 66, negative voltage condition is applied to the conductor 130. As a negative voltage condition is being applied to the conductor 131, the AND-gate 133 is enabled and the capacitor 138 can charge. When a ground voltage condition is applied to the conductor 144, at the end of the delay time of the time delays, 53 and 140, the capacitor 138 is rereferenced and the control memory 40 is reset via a positive-going voltage condition applied via the conductor 146 to the transistor Q2 of the control memory 40.

When the control memory 40 is reset, conductors 68 and 68' are at negative voltage. The lock memory 56 was reset via the pedestal gate 152 when the memory 49 was reset to effect application of a negative voltage condition, to the NOR-gate 57 via the conductor 58. As the conductors 68' and 58 are both at negative voltage condition, the NOR-gate 57 is no longer enabled and the keyboard lock solenoid 60' is no longer energized. Therefore, the keyboard 30 is now free to be operated.

In the keyboard mode of operation, each time a signal key (not shown) is depressed it will cause setting of predetermined pedestal gates of the group 70 corresponding to the selected signal. Regardless of which signal key is depressed, the operation of the time delay 53 is initiated because the pedestal gate 30' triggers the one-shot delay 53. The delay 140 allows the capacitors of the predetermined pedestal gates of the set of pedestal gates 155 through 162 enough time to charge before they are rereferenced. This assures that the memory devices of the group 70' which correspond to these predetermined pedestal gates of the group of pedestal gates 155 through 162 will be set.

Following depression of any signal key of the key board 30, and at the initiation of operation of the delay 53, the pedestal gate 54 will be triggered, thereby setting the keyboard lock memory 56 and enabling the NOR-gate 57 to energize the solenoid 60' to lock the keyboard 30. When the group 70'' of pedestal gates is triggered, the pedestal gate 149 is also triggered to reset the system-has-signal-to-process memory 49, thereby resetting the lock memory 56 to disable the NOR-gate 57 to effect unlocking of the keyboard 30. Although the keyboard 30 is adequately described above, reference may be had to applicant's copending U.S. Pat. application Ser. No. 657,392, now Pat. No. 3,466,647, filed July 31, 1967, for additional details.

The invention may be embodied in other specific forms without departing from the spirit or essential characteristics thereof. The present embodiment is therefore to be considered in all respects as illustrative and not restrictive, the scope of the invention being best defined by the appended claims rather than by the foregoing description, and all changes which come within the meaning and range of equivalency of the claims are therefore intended to be embraced therein.

I claim:

1. For a communication system:

means for generating a message composed of successive binary code data signals, each signal being composed of a predetermined combination of data bits, said signal generating means including a plurality of memory devices each providing a data bit output, a plurality of pedestal gates for operating respective memory devices, a succession of coded means each electrically connected to predetermined ones of said pedestal gates and each including mounting structure and a diode matrix carried by said mounting structure, each diode matrix having a plurality of diode positions, the positions containing diodes determining the pedestal gates to which signal bits are supplied, means for providing for ready removal of said mounting structure and its diode matrix and replacement by another mounting structure having a different diode matrix, means for completing network circuits through successive ones of said coded means and respective pedestal gates including an electronic distributor, and means for triggering said pedestal gates while each successive network circuit is complete, said triggering means including means for advancing said electronic distributor between times when said pedestal gates are triggered.

2. The invention as defined in claim 1, wherein said circuit-completing means includes an electronic distributor, an AND gate effective when enabled for enabling advance of said electronic distributor, and means for enabling said AND gates each time said electronic distributor is to be advanced; said triggering means including time delay means responsive to said AND gate and being effective only after said electronic distributor has been advanced.

3. In a communication system having a plurality of stations each equipped with a keyboard and a printer or with other equivalent data transmission and reception means, an automatic signal generator comprising:

an electronic distributor for sequentially energizing a plurality of outputs;

a plurality of coding means each having an input connecting to a distributor output and each having parallel data outputs, each said coding means comprising a mounting structure and a diode matrix carried by said mounting structure, each diode matrix having a variable number of diodes interconnecting the input with a variable number of the parallel data outputs;

means providing for ready removal of each said mounting structure and its diode matrix and further providing for their replacement by other mounting structures having different diode matrices; and data code generating means having parallel data inputs connecting to the parallel data outputs of each of said coding means.

4. For a communication system: means for generating data signals including a keyboard and a message generator for generating a succession of signals constituting a message, said message generator including control means and an electronic distributor, output means for signals generated selectively by said keyboard and by said message generator, means for initially actuating said control means, means responsive to said control means for advancing said electronic distributor for generating one of said signals, means operable upon transfer of each successive signal out of said output means for automatically reoperating said control means to advance said electronic distributor until the entire message has been generated, means responsive when the entire message has been generated for rendering said control means ineffective until said initial actuating means is reactuated, a control memory, means for resetting said control memory at the end of the message, delay means operable by either of said keyboard and said message generator, means electrically connecting said delay means and said electronic distributor to said resetting means, gating means selectively operable by said keyboard, and means electrically connecting said delay means and each of said gating means.

5. For a communication system: means for generating data signals including a keyboard and a message generator for generating a succession of signals constituting a message, a group of memory devices having a group of data bit outputs, a plurality of first gates operatively connected to said memory devices, said message generator including an electronic distributor and control means for advancing said electronic distributor and for operating said first gates, a plurality of second gates operatively connecting said keyboard to said memory devices, timing means for producing a timed pulse longer in duration than the duration of time required to operate said memory devices from either said keyboard or said message generator, means responsive to either of said keyboard and said message generator for initiating operation of said timing means, means responsive both to a ready from a receiver of signals from said memory devices and to the end of said timed pulse for transferring a signal out of said memory devices.

6. The invention as defined in claim 5, including a bistable device operable by said timing means and electrically connected to said transferring means.

7. The invention as defined in claim 5, wherein said transferring means include a gating circuit.

8. The invention as defined in claim 5, including means responsive to operation of said transferring means and effective after a signal has been transferred out of said memory devices for resetting said memory devices.

* * * * *